Oct. 28, 1952 W. I. CARLSON 2,615,648

MEASURING TAPE REEL DEVICE

Filed April 24, 1950

William I. Carlson
INVENTOR.

BY Clarence A. O'Brien
and Harvey B. Jacobson
Attorneys

Patented Oct. 28, 1952

2,615,648

UNITED STATES PATENT OFFICE 2,615,648

MEASURING TAPE REEL DEVICE

William I. Carlson, Detroit, Mich.

Application April 24, 1950, Serial No. 157,798

1 Claim. (Cl. 242—84.9)

The present invention relates to improvements in pen rules of the type disclosed in my co-pending application Serial No. 607,361, filed July 27, 1945, now Patent Number 2,508,372, issued May 23, 1950.

This invention has for its object to provide such means that are convenient in use, economical in manufacture, relatively simple, and of general superiority and serviceability.

The improvements in the present invention reside primarily in the reduction in the number of parts, the novel locking means, and the arrangement of the springs.

Various other objects and advantages will be apparent from the detailed description to follow.

The best form in which I have contemplated applying my invention is illustrated in the accompanying drawings, in which.

Figure 1:
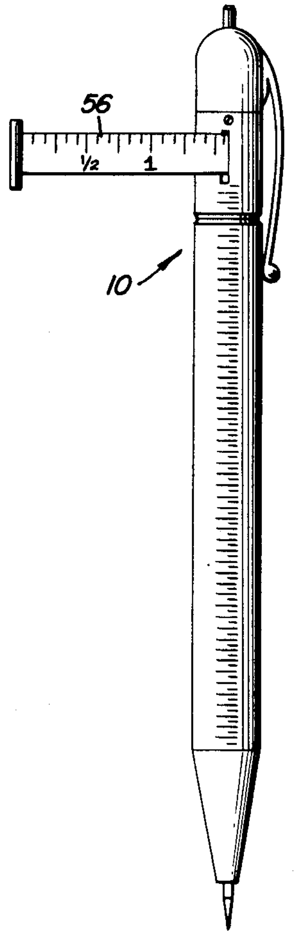
Figure 1 is a view of the entire device of the present invention showing the tape rule partially extended.

Referring more particularly to the drawings wherein like numerals designate like parts throughout, the numeral 10 designates generally the pen rule of the invention. The pen rule consists of a tubular casing 12, a cap 14 secured in one end of the tubular casing by screws 16. The cap 14 is provided with a centrally positioned aperture 18 providing a bearing. At a point intermediate its length the tubular casing 12 is provided with a partition 20 held in position in the casing by means of crimp 22 engaging the groove 24 in the partition. The partition 20 is also provided with a central aperture 26 which is in alignment with the aperture 18 and also provides a bearing surface.

Figure 3:
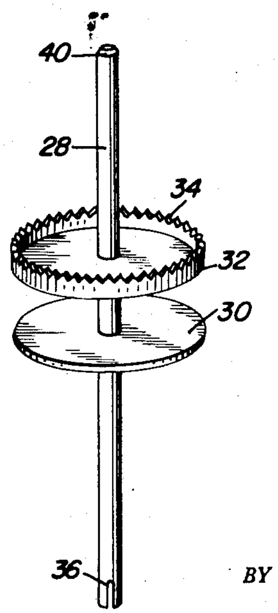

Journalled in the bearing apertures 18 and 26, is the shaft and reel which is shown best in Figure 3. The shaft 28 has integrally mounted thereon a disc 30 intermediate its length and a cup-shaped member 32 having its upper edges serrated as at 34. The lower end of the shaft 28 is provided with a bifurcation 36.

Figure 2:
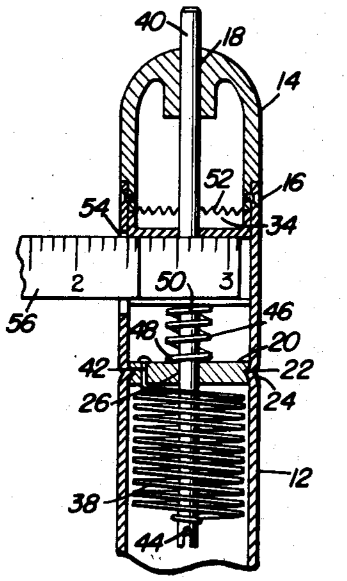
Figure 2 is a longitudinal cross sectional view showing the interior of the pen rule with parts broken away; and, Figure 3 is an expanded view of the reel and shaft.

With the shaft and reel in position in the casing as shown in Figure 2, the end 40 of the shaft 28 extends through the aperture 18 in the cap 14 providing a finger engaging portion. A torsion spring 38 is provided below the partition 20 and has one end thereof secured in the partition 20 and the other end 44 received in the bifurcation 36 so that when the shaft is rotated the torsion spring 38 will be deformed and will tend to urge the shaft back to its original position. A second spring 46 is positioned around the shaft 28 with one of its ends 48 bearing against the partition 20 and its other end resiliently urging the disc 30 upwardly.

The lower end of the cap 14 is provided with serrations 52 which are adapted to cooperate with the serrations 34 of the cup-shaped member 32 when the shaft 28 and reel are in the upwardly urged position.

The casing 12 is provided with a longitudinal slot 54 through which a tape 56 may be withdrawn. The slot 54 is positioned to be in communication with the reel so that one end of the tape 56 may be secured to the shaft 28 for winding of the reel.

From the above description it will readily be seen that when the tape 56 is to be withdrawn through the slot 54, the finger engaging portion 40 is pressed downwardly in opposition to the compression spring 46 disengaging the serrations 34 from the serrations 52, thus permitting free withdrawal of the tape 56. When the tape has been withdrawn the desired amount, the finger portion may be released allowing the compression spring to urge the serrations into cooperation thus locking the tape from re-entry. It will be noted that the withdrawal of the tape 56 will be opposed by the torsion spring 38 which has one end 44 revolving with the shaft and the other end 42 fixed in the partition. If the finger portion is again pressed downwardly, and the tape 56 released, the torsion spring 38 will return to its relaxed position at the same time rotating the shaft 28 causing the tape to be wound up on the reel.

Some changes may be made in the construction and arrangement of the parts of my device without departing from the real spirit and purpose of my invention and it is my intention to cover by my claim any modified forms of structure or use of mechanical improvements which may reasonably be included within the scope of the invention without sacrificing any of the advantages thereof.

Having described the invention, what is claimed as new is:

A device of the character described comprising a tubular casing open at one end and having a longitudinal slot therein, an apertured cap removably mounted on the open end of the casing and including an externally reduced lower portion secured in said casing, teeth on the lower end of the cap, an apertured partition fixed in the casing below the slot, a shaft rotatably and slidably mounted in the partition and cap and projecting upwardly from the latter, a disk fixed on the shaft at a point intermediate the ends of said shaft, a substantially cup-shaped member fixed on the shaft in spaced relation to the disk and providing, in conjunction with said disk and the shaft, a reel slidable and rotatable in the casing, teeth on the top of said cup shaped member engageable with the first named teeth for releasably locking the shaft against rotation, a coil spring encircling the shaft between the partition and the disk for yieldingly urging the second named teeth into engagement with the first named teeth, a measuring tape wound on the reel and operable in the slot, and a rewinding spring for the tape having one end anchored to the partition and its other end anchored to the shaft.

WILLIAM I. CARLSON.

REFERENCES CITED

The following references are of record in the file of this patent:

UNITED STATES PATENTS

| Number | Name | Date |
|---|---|---|
| 661,202 | Wright | Nov. 6, 1900 |
| 1,714,225 | Hyde et al. | May 21, 1929 |
| 1,759,596 | Steudte | May 20, 1930 |
| 2,403,653 | Geohegan et al. | July 9, 1946 |
| 2,434,119 | Nordmark | Jan. 6, 1948 |
| 2,508,372 | Carlson | May 23, 1950 |

FOREIGN PATENTS

| Number | Country | Date |
|---|---|---|
| 534,172 | Germany | Sept. 23, 1931 |